US006454163B2

(12) United States Patent

Peebles et al.

(10) Patent No.: US 6,454,163 B2

(45) Date of Patent: Sep. 24, 2002

(54) SELF-SERVICE TERMINAL

(75) Inventors: John A. Peebles, Dundee (GB); Fredrik L. N. Kallin, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/891,921

(22) Filed: Jun. 26, 2001

(30) Foreign Application Priority Data

Jul. 7, 2000 (GB) .......................................... 0016596

(51) Int. Cl.[7] ......................... G06F 17/60; G06K 13/00

(52) U.S. Cl. ...................................... 235/379; 235/475

(58) Field of Search ............................... 235/384, 379, 235/380, 381, 475; 705/43

(56) References Cited

U.S. PATENT DOCUMENTS

| | | | | |
|---|---|---|---|---|
| 4,398,088 A | | 8/1983 | Hirose et al. | 235/379 |
| 4,554,444 A | * | 11/1985 | Hirose | 235/379 |
| 4,577,763 A | * | 3/1986 | Placke et al. | 209/534 |
| 5,021,639 A | * | 6/1991 | Hara et al. | 235/379 |
| 5,071,031 A | * | 12/1991 | Yuge et al. | 221/3 |
| 5,271,613 A | * | 12/1993 | Hain | 271/3.1 |
| 5,436,435 A | * | 7/1995 | McMillan | 235/379 |
| 5,719,383 A | * | 2/1998 | Forrest | 235/379 |
| 5,975,273 A | * | 11/1999 | Zwahlen et al. | 194/206 |
| 6,006,989 A | * | 12/1999 | Ademmer et al. | 235/379 |
| 6,073,837 A | * | 6/2000 | Milne | 235/379 |
| 6,196,464 B1 | * | 3/2001 | Patterson et al. | 235/477 |

FOREIGN PATENT DOCUMENTS

| | | | |
|---|---|---|---|
| EP | 0317537 | | 5/1989 |
| EP | 0473106 | | 3/1992 |
| EP | 0720133 | | 7/1996 |
| GB | 2104877 A | * | 3/1983 |
| GB | 2124005 | | 2/1984 |
| GB | 2244838 | | 12/1991 |
| WO | WO 92/17856 | * | 10/1992 |

* cited by examiner

*Primary Examiner*—Karl D. Frech
*Assistant Examiner*—April A. Nowlin
(74) *Attorney, Agent, or Firm*—Francis L. Conte

(57) ABSTRACT

A media escrow unit (24) is provided for use in dispensing or depositing media. The escrow unit (24) is arranged in use with a media removal path (42) leading from a media receptacle (32), and communicating with a media return path (44) leading to the media receptacle. In use, media may be removed from the receptacle (32) and passed through media validation sensors (20, 22) before being returned to the receptacle (32). The media may then either be presented from the escrow unit (24) to a user, or passed via the media removal path (42) to a media storage location, depending on the outputs obtained from the media validation sensors (20, 22), and the actions of the user. Also provided is a self-service terminal incorporating such an escrow unit; and methods of dispensing or depositing media.

20 Claims, 3 Drawing Sheets

SELF-SERVICE TERMINAL

BACKGROUND OF THE INVENTION

The present invention relates to a self-service terminal (SST) such as an automated teller machine (ATM), and to a method of operating an SST. In particular, embodiments of the invention relate to an ATM in which deposited or dispensed media may be held in escrow while the media is validated.

Self-service terminals (SST) are commonly used for conducting a range of financial transactions. Chief among these is the dispensing of banknotes or other media. A number of SSTs also have the facility to accept deposits of media. However, before a media deposit can be accepted by an SST, the media is preferably first validated, to ensure that the media deposited is genuine, and is in an acceptable format; if the media fails validation, it may be returned to the user. Further, if a user cancels a deposit transaction part-way through, any media deposited should also be returned to the user.

Ideally, any returned media should be the same media as was deposited; particularly if there is a validation failure. The preferred mechanism of accommodating this is to provide SSTs with an escrow facility: deposited media is held in escrow pending validation or confirmation of the transaction; only once it has been confirmed that the deposit is to be accepted will the media leave the escrow unit for the media deposit safe. Escrow units may also be applied to media dispensing: a bundle of banknotes to be dispensed may be held in escrow pending confirmation of the transaction and validation of the dispensed currency; if the transaction is not to proceed, the notes may be transferred from the escrow unit to a reject note bin.

Common methods of providing escrowing include stacker wheel re-bunching and roll escrows. However, both of these occupy a relatively large amount of space, and roll escrows can be expensive. It is also necessary to provide separate transport for the media between the user interface and the escrow unit, so further increasing the space requirements and cost of such escrows.

SUMMARY OF THE INVENTION

It is among the objects of embodiments of the present invention to obviate or alleviate these and other disadvantages of existing escrow systems. This is achieved, in part, by providing a compact escrow unit which may be fitted in the path of the normal media deposit/dispense route, so eliminating the need for a separate escrow transport mechanism.

According to a first aspect of the present invention, there is provided a method of depositing media, the method comprising the steps of:

receiving media to be deposited in a media receptacle;

removing the media from the receptacle;

returning the media to the media receptacle via a media validation pathway;

determining whether the deposited media is to be accepted; and transferring accepted media from the media receptacle to accepted media storage.

The present invention thus provides a method which provides for receipt of a deposit in a media receptacle, and then validated and returned to the same receptacle pending acceptance; the receptacle can thus act as its own escrow unit so obviating the requirement to provide additional space for a separate escrow unit.

Preferably the media is received through a media deposit port of a self-service terminal (SST).

The step of removing the media from the receptacle may comprise the step of transferring individual media items directly from the receptacle to the media validation pathway. Preferably, however, the method comprises the separate steps of removing the media from the receptacle; and then transferring individual media items to the media validation pathway. Preferably the media items are transferred by being picked individually onto the validation pathway. Suitable friction and vacuum pick mechanisms are known in the art. Conveniently, where a pick mechanism is employed, the media is biased against the pick mechanism; more preferably, the receptacle is arranged to bias the media against the pick mechanism.

Preferably the step of returning the media to the media receptacle via a media validation pathway comprises the step of validating the media. Conveniently this is achieved by passing the media by or through means for validating media, which may be disposed in the validation pathway. The media validation means may comprise a note thickness sensor (NTS), to determine whether single or multiple notes have been picked. The validation means may additionally or alternatively comprise means for identifying media, to identify the denomination or value of deposited media; and/or means for detecting media forgery, to determine whether or not genuine media have been deposited. Such media validation means are known in the art.

The step of determining whether the deposited media is to be accepted may comprise the steps of identifying any media failing validation, and not accepting a deposit containing failed media. The acceptance determination step may alternatively or in addition comprise the step of requesting a user to confirm the deposit. For example, the user may be informed of the value of the deposit as determined by the means for validating media, and asked to confirm this value; if the user disagrees with the validation, they may cancel the transaction at this stage.

The step of transferring accepted media to accepted media storage preferably comprises the step of moving the media along at least part of the media validation pathway. It is preferred that the route to the media storage branches off the route of the media validation pathway; thus, space and expense is reduced by having a unitary media pathway over much of the length of both the media validation and media storage routes. The common part of the route may include some or all of the means for validating media, to reconfirm the acceptability of the media. The transfer step may therefore further comprise the step of validating the media.

The method may further comprise the step of transferring accepted media to one of a plurality of different accepted media storage locations. For example, banknotes of different denominations may be transferred to different media storage locations. This is particularly preferred if deposited media may be re-issued from the SST during a later transaction. If this is the case, then it is preferred that the media is revalidated before entering media storage; alternatively, the sequence of denominations of deposited media may be recorded from the initial pass through the validation pathway, and the media sorted appropriately.

The method may further comprise the step of returning non-accepted media to a user. Preferably the media is returned through a media return port of an SST. Most conveniently, the media return port also serves as the media deposit port. Alternatively, non-accepted media may be transferred to a rejected media storage location.

According to a second aspect of the present invention, there is provided a method of dispensing media, the method comprising the steps of:

- picking media to be dispensed from one or more media storage locations;
- passing the media via a media validation pathway to a media receptacle;
- determining whether the media is to be dispensed; and
- presenting dispensed media directly from the receptacle to a user.

Preferably the method further comprises the step of: if the media is not to be dispensed, transferring the media from the media receptacle to a rejected media storage location.

Preferably the transfer step comprises the step of moving the media along at least part of the media validation pathway.

According to a third aspect of the present invention, there is provided a media escrow unit, the unit comprising:

- a media receptacle for receiving media;
- a media removal path, leading from the media receptacle;
- a media return path, leading to the media receptacle; and
- means for transferring media from the receptacle to the removal path;
- in use, the media removal path being in communication with the media return path.

The escrow unit of the present invention may be used in implementing the other aspects of the present invention, as will be described.

Conveniently, the media transfer means may comprise a media picker, such as a vacuum pick or a friction pick unit; or the transfer means may comprise means for removing media from the receptacle to a first location, and means for transferring media from the first location to the media removal path.

Preferably the unit further comprises means for biasing media against the media transfer means. Conveniently the media receptacle may be adapted to bias media against the media transfer means. Preferably the receptacle is movable, to selectively bias media against the media transfer means. Alternatively, the biasing means may comprise a spring-urged plate or the like, arranged to urge media against the transfer means.

Conveniently the receptacle is movable to a position to allow receipt or presentation of media. Alternatively, the unit may comprise means for allowing receipt or presentation of media to or from the receptacle; for example, rollers, guides or conveyors.

According to a fourth aspect of the present invention, there is provided a self-service terminal (SST), the SST comprising:

- a media escrow unit comprising a media receptacle for receiving media; a media removal path, leading from the media receptacle; a media return path, leading to the media receptacle; and a media picker for transferring media from the receptacle to the removal path;
- means for validating media; and
- accepted media storage;
- the media removal path selectively communicating with both the media return path and the accepted media storage such that a first media flow path lies along the media removal path, through the means for validating media, to the media return path, and a second media flow path lies along the media removal path to the accepted media storage.

Preferably the SST further comprises one or more media dispense units for dispensing media, with a media flow path leading from the dispense unit or units, passing through the means for validating media, to the media return path.

Conveniently the accepted media storage further comprises means for dispensing stored media to a media flow path, the flow path leading to the media return path.

Preferably the SST further comprises rejected media storage.

BRIEF DESCRIPTION OF THE DRAWINGS

These and other aspects of embodiments of the present invention will now be described by way of example only and with reference to the accompanying drawings, in which.

DETAILED DESCRIPTION

Figure 1:
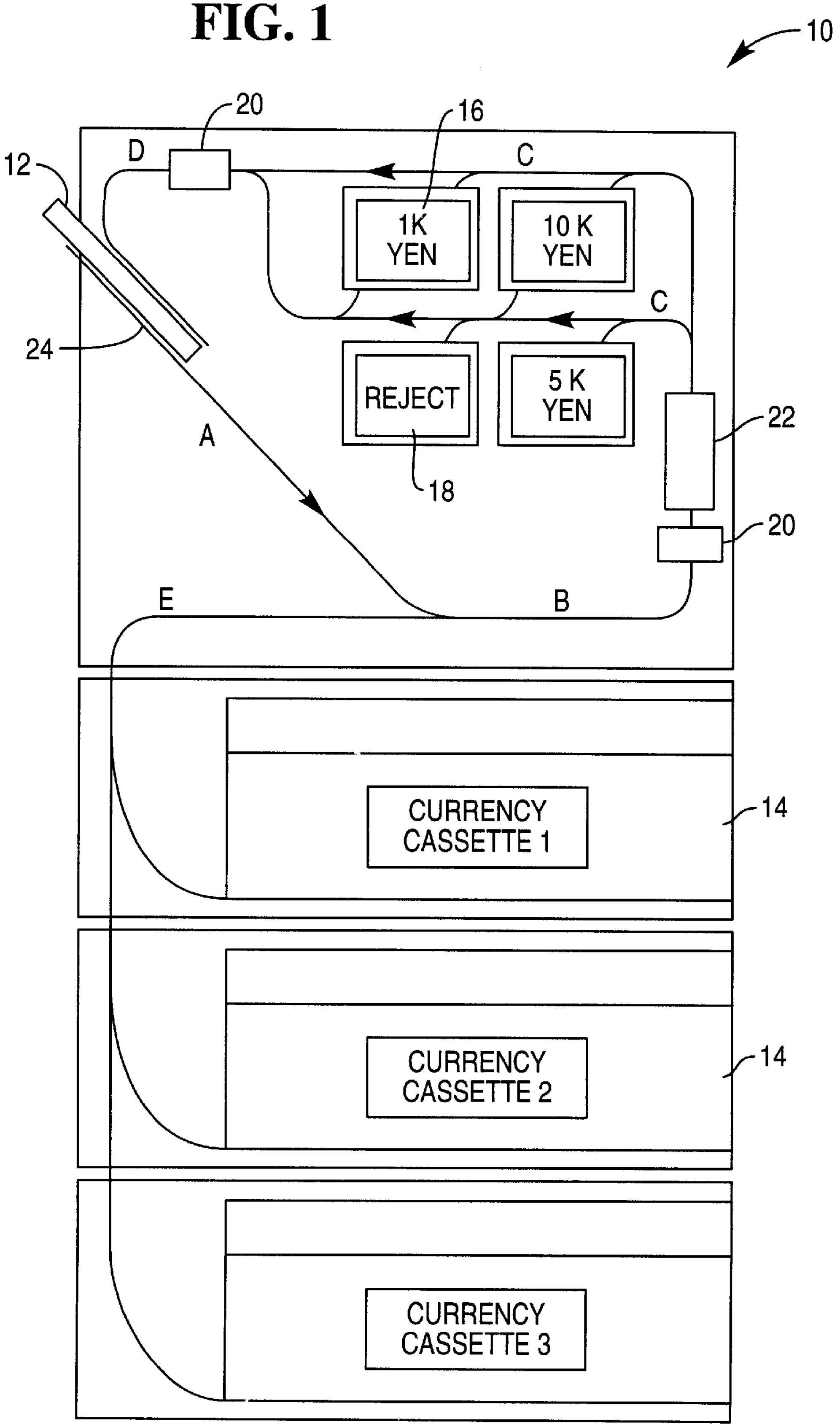
FIG. 1 shows a schematic diagram of a self-service terminal (SST) including a media escrow unit, in accordance with one embodiment of the present invention.

Referring first of all to FIG. 1, this shows a schematic diagram of a self-service terminal (SST) in the form of an automated teller machine (ATM), which includes an escrow unit, and provides a media recycling facility—that is, deposited media may subsequently re-dispensed to a user; this is a very useful facility, as it tends to increase the average time between replenishments of the ATM.

The ATM 10 presents a number of modules to a user, the majority of which are not shown here; for example, a smart card reader, a display screen, a numeric keypad, and the like. A media entry/exit slot 12 is shown, through which a user may deposit or withdraw banknotes.

Within the body of the ATM 10 are included a number (in this case, three) of currency dispense cassettes 14, each of which is stocked with a number of banknotes of a particular denomination. Also shown in the figure are three accepted media storage bins 16, for containing deposited banknotes of different denominations, and a single rejected media storage bin 18, for containing rejected media deposits and dispenses.

The ATM 10 further includes two note thickness sensors 20, a media validation/identification module 22, and an escrow unit 24 disposed adjacent the media entry/exit slot 12.

A series of arrows and lines within the ATM 10 identified by the letters A to E indicate possible flow paths for media such as banknotes to follow.

The broad operation of the ATM 10 will now be described.

When a user wishes to deposit banknotes into the ATM 10, they insert a bundle of notes through the media entry/exit slot 12 into the escrow unit 24. The notes are stripped from the escrow unit by a bill picker, and fed singly into the media flow path at portion A. Passing into portion B, the notes pass through the note thickness sensor 20 and validation/identification module 22, which together determine whether the notes are single or multiple, and the denomination and validity of the notes. Passing along sections C and D of the flow path, the notes return to the escrow unit 24. Thus, the deposited notes have now been verified and validated, and are in the original deposit location.

The ATM 10 then asks the user to confirm their deposit: it may also indicate the value of the deposit as calculated by the validation/identification module 22. If the user wishes to cancel the deposit, or if the ATM 10 found invalid notes amongst the deposit, the notes will be returned to the user through the media entry/exit slot 12. In this way the user receives the same notes as they deposited. If the deposit is confirmed, the bill picker again passes the notes singly along paths A and B, where the note thickness is again checked by detector 20, and the notes once more identified by identification module 22. The notes are then passed along the appropriate branch of path C, into the correct accepted media storage bin 16.

When a user wishes to withdraw banknotes from the SST, the procedure is somewhat similar. The required quantity of notes are removed from the appropriate currency cassettes 14, along path E, where they join the main note path at B. The note thickness sensor 20 confirms that the notes have been removed singly from the cassettes 14, and the notes are passed along path C. If the ATM 10 is recycling deposited notes, some notes may be removed from the two uppermost storage bins 16 to join the media flow, by a conventional note pick arrangement; in this case the notes are again checked for thickness by the second note thickness sensor 20, before passing along path D to the escrow unit 24. The ATM 10 will, in practice, monitor the number of notes held in each storage bin 16, so that the need to dispense fresh notes rather than recycled notes can be anticipated.

If the notes have been determined as correct by the thickness sensors 20, the bundle of notes may be presented to the user through slot 12 for dispensing; if however there is a problem with the notes, the whole contents of the escrow unit 24 can be fed along paths A, B and C of the media transport path, and dumped into reject bin 18, for later verification by a human operator. The ATM 10 will then attempt to dispense a fresh set of banknotes to the user.

The operation of the escrow unit 24 as used with the ATM of FIG. 1 will now be described. Note that in FIGS. 2*a*–2*f* and 3*a*–3*f*, for convenience the escrow unit has been shown in a horizontal orientation, rather than the angled orientation illustrated in FIG. 1.

Figure 2A:
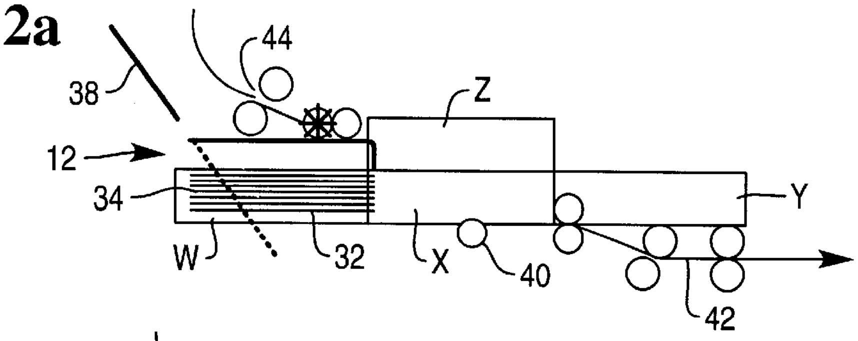
FIGS. 2*a*–2*f* show an escrow unit as used in the SST of FIG. 1 in the process of receiving a media deposit.
Figure 2B:
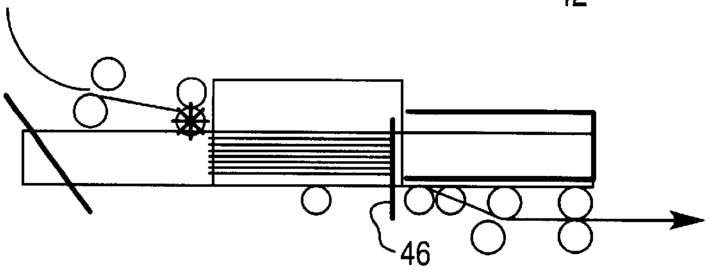

FIGS. 2*a*–2*f* show the sequence of operation of such an escrow unit when accepting a media deposit. Referring first of all to FIG. 2*a*, in this can be seen a media receptacle 32, containing a bundle of banknotes 34 which has been deposited through media entry slot 12. A shutter 38 has opened to allow a user access to the receptacle 32. A friction pick mechanism 40 is located at the underside of the escrow unit, leading to a media removal path 42; a media return path 44 leads back into the escrow unit. The media removal and return paths 42, 44 are in communication as described above with reference to FIG. 1. The escrow unit also provides four distinct positions in which the receptacle 32 may be located, denoted by the letters W to Z, being, in general terms, in forward, central, rear and top positions. However, it will be clear to those of skill in the art that the invention may be implemented moving only the banknotes, and not the receptacle.

Figure 2C:
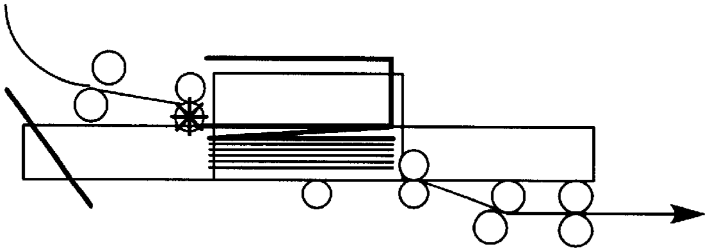

The note stripper 46 is removed, and the receptacle 32 moved from rear position Y to the top position Z, where the receptacle 32 bears down upon the bundle of banknotes 34, biasing the note bundle 34 against the note picker 40 (FIG. 2*c*).

Figure 2D:
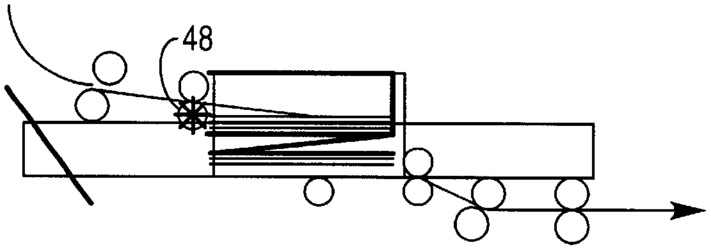
Figure 2E:
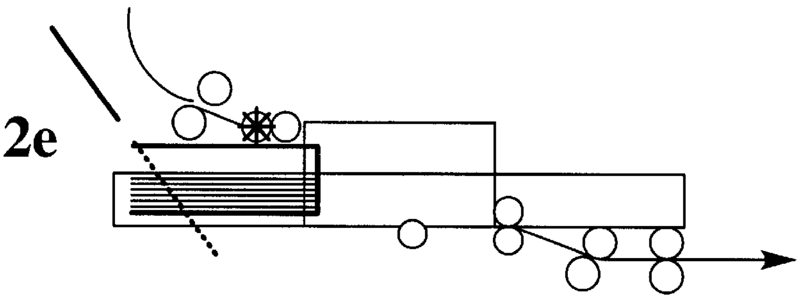
Figure 2F:
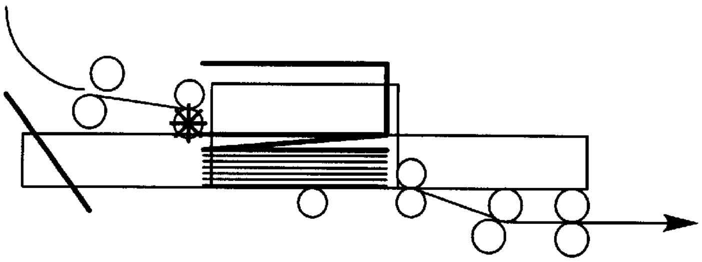

The notes are then picked from the bundle 34 one at a time, and sent through the media removal path 42, via note thickness sensors and a validation unit as described, to the media return path 44, and back into the receptacle 32 (FIG. 2*d*). A flexible rubber flicker wheel 48 adjacent the entrance to the receptacle 32 ensures that the returning banknotes enter the receptacle 32 individually and correctly.

Once all the notes have returned to the receptacle 32, the ATM will then determine, as has been described, whether or not the deposit is acceptable. If the deposit is not accepted (FIG. 2*e*), the shutter 38 opens, while the receptacle 32 containing the rejected notes 34 moves to the forward position W, so presenting the notes to the user for retrieval. However, if the notes are accepted (FIG. 2*f*), the notes are once more stripped from the receptacle 32, the receptacle 32 moves to the top position Z, and the notes are picked by picker 40 and sent along media removal path 42 to the accepted note storage bins 16 of the ATM, as described above.

The method of dispensing banknotes is shown in FIGS. 3*a*–3*f*. This makes use of the same escrow unit as illustrated in FIGS. 2*a*–2*f*.

Figure 3A:
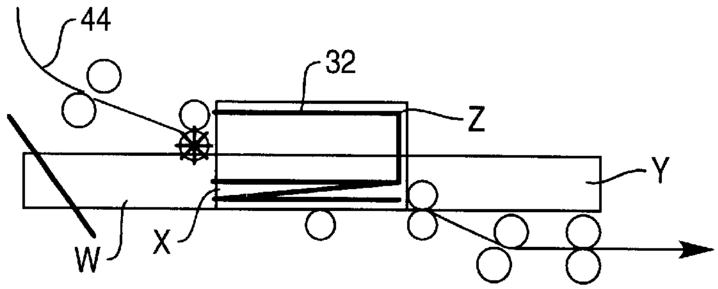
FIGS. 3*a*–3*f* show the escrow unit of FIGS. 2*a*–2*f* in the process of dispensing media.
Figure 3B:
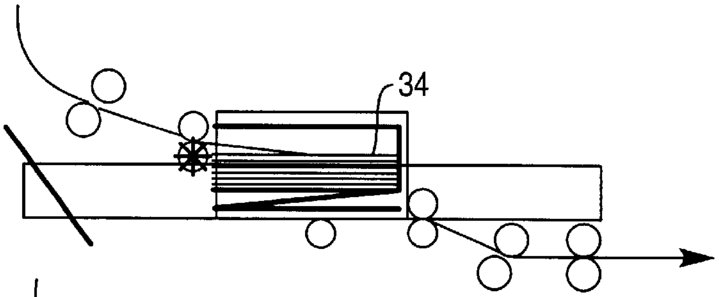

Firstly, as shown in FIG. 3*a*, the receptacle 32 is located in the central position X. Banknotes 34 are picked from currency dispense cassettes in the body of the ATM, as previously described, and passed through the note thickness sensors along the media return path 44 into the receptacle 32 (FIG. 3*b*).

Figure 3C:
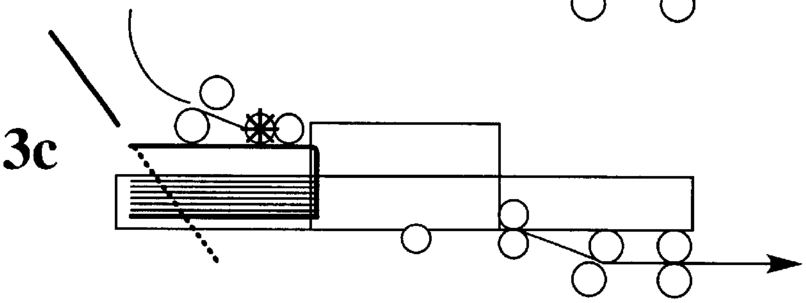
Figure 3D:
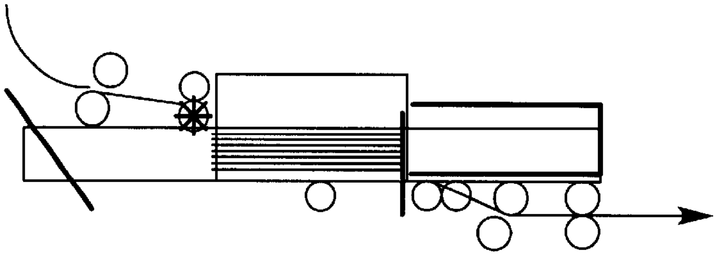
Figure 3E:
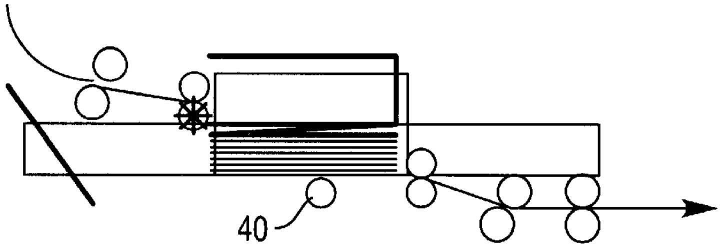

If the note thickness sensors detect no problems with the dispensed notes 34, the shutter 38 opens and the receptacle 32 is moved into the forward position W, to present the note bundle 34 to the user for collection (FIG. 3*c*).

Figure 3F:
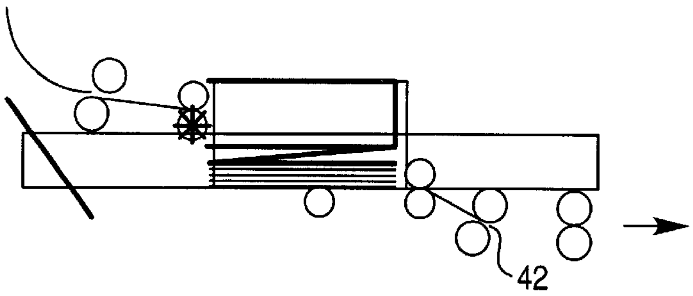

If however there is a problem with the notes, or the user does not take the presented bundle, the notes 34 are stripped from the receptacle 32, which moves to the rear position Y (FIG. 3*d*) the receptacle 32 is then moved to the top position Z, to bias the note bundle 34 against the pick mechanism 40 (FIG. 3*e*), and the notes picked and passed along the note removal path 42 into the rejected note bin (FIG. 3*f*).

It can be seen that the present invention therefore provides an escrow mechanism whereby notes may be held in escrow pending verification, and either deposited, purged, dispensed, or returned to the user as appropriate, using only a single media entry/exit slot, and so providing a relatively compact mechanism.

What is claimed is:

1. A method of depositing media, the method comprising the steps of:

receiving media to be deposited in a media receptacle;

removing the media from the media receptacle;

returning the same media to the media receptacle via a media validation pathway;

determining whether the deposited media removed and returned to the receptacle is to be accepted; and transferring the same media from the media receptacle to accepted media storage.

2. A method of depositing media comprising:

receiving media to be deposited in a media receptacle;

removing the media from the media receptacle;

returning the same media which has been removed from the media receptacle back to the media receptacle via a media validation pathway;

determining whether the media which has been removed and returned to the media receptacle is acceptable; and transferring the same media from the media receptacle to accepted media storage to deposit the media when a determination is made that the media is acceptable.

3. A media escrow unit comprising:

an access slot for receiving media;

a media receptacle disposed adjacent said slot for receiving media therefrom;

means defining a media removal path leading from the media receptacle;

means defining a media return path leading to the media receptacle connected in communication with the media removal path; and media transfer means for transferring the same media from the media receptacle firstly to the media removal path and return path back to the media receptacle, and secondly from the receptacle again to the media removal path.

4. A media escrow unit according to claim 3, wherein the media transfer means includes a media picker.

5. A media escrow unit according to claim 3, wherein the media transfer means includes means for removing media from the media receptacle to a first location, and means for transferring media from the first location to the media removal path.

6. A media escrow unit according to claim 3, wherein the media receptacle is movable, to selectively bias media against the media transfer means.

7. A media escrow unit according to claim 3, wherein the media receptacle is movable to a position to allow receipt or presentation of media.

8. A self-service terminal comprising:

an access slot for depositing and withdrawing media;

a media escrow unit including (i) a media receptacle disposed adjacent the slot for receiving media therefrom, (ii) means defining a media removal path leading from the media receptacle, (iii) means defining a media return path leading to the media receptacle, and (iv) a media picker for transferring media from the media receptacle to the media removal path;

means for validating media from the removal path;

accepted media storage;

means for enabling the media removal path to selectively communicate with the media return path and the accepted media storage such that (i) a first media flow path lies along the media removal path and passes through the validating means to the media return path, and (ii) a second media flow path lies along the media removal path to the accepted media storage; and means for transporting the same media from the receptacle firstly along the first media flow path for return back to the receptacle, and secondly from the receptacle along the second media flow path to the accepted media storage.

9. A self-service terminal according to claim 8, further comprising at least one media dispense unit for dispensing media along a media flow path which leads from the dispense unit and passes through the validating means to the media return path.

10. A self-service terminal according claim 8, wherein the accepted media storage includes means for dispensing stored media to a media flow path which leads to the media return path.

11. A self service terminal comprising:

an access slot for depositing and withdrawing banknotes by a user;

an escrow receptacle disposed adjacent said slot for receiving a banknote deposited therein through said slot;

a plurality of deposit bins for respectively storing banknotes of different denominations;

means for validating said deposited banknote between said receptacle and bins; and means for transporting said deposited banknote in a looping validation pathway firstly from said receptacle, to said validating means for validation, and bypassing said bins returning back to said receptacle, and secondly from said receptacle, again to said validating means, and then into one of said bins upon validation by said validating means.

12. A terminal according to claim 11 further comprising a shutter disposed at said access slot and positionable in an open position for permitting access through said slot for initially depositing said banknote, and for retrieving said banknote when not validated by said validating means; and in a closed position closing access through said slot after depositing said banknote.

13. A terminal according to claim 11 further comprising means for moving said receptacle away from said access slot after deposit of said banknote therein.

14. A terminal according to claim 13 further comprising means for stripping said deposited banknote from said receptacle as said receptacle is moved away from said access slot.

15. A terminal according to claim 14 further comprising means for moving said receptacle atop said banknote stripped therefrom in bias thereagainst.

16. A terminal according to claim 15 further comprising means for picking said stripped banknote from below said receptacle and into said transporting means for return to said receptacle.

17. A terminal according to claim 16 further comprising means for moving said receptacle back to said access slot for rejecting said banknote returned thereto upon invalidation by said validating means.

18. A terminal according to claim 11 further comprising means for moving said receptacle in sequence from a first position adjacent said slot for deposit of said banknote, to a second position spaced away from said first position, to a third position atop and between said first and second positions, and back to said first position.

19. A terminal according to claim 18 further comprising:

means for stripping said deposited banknote from said receptacle as said receptacle is moved between said first and second positions;

said moving means then being effective to bias said receptacle in said third position atop said stripped banknote; and means for picking said stripped banknote from below said receptacle and into said transporting means for return to said receptacle at said third position.

20. A terminal according to claim 11 further comprising:

a plurality of currency dispense cassettes for stocking corresponding banknote denominations; and means for transporting banknotes from said cassettes to said validation pathway for dispensing in said escrow receptacle.

* * * * *